(12) United States Patent
Alshalabi

(10) Patent No.: US 9,783,103 B2
(45) Date of Patent: Oct. 10, 2017

(54) ILLUMINATED VEHICLE ACCESSORY SYSTEM

(71) Applicant: Ahmad Alshalabi, Valparaiso, IN (US)

(72) Inventor: Ahmad Alshalabi, Valparaiso, IN (US)

( * ) Notice: Subject to any disclaimer, the term of this patent is extended or adjusted under 35 U.S.C. 154(b) by 480 days.

(21) Appl. No.: 14/550,714

(22) Filed: Nov. 21, 2014

(65) Prior Publication Data

US 2016/0144774 A1  May 26, 2016

(51) Int. Cl.
| | |
|---|---|
| *B60Q 1/26* | (2006.01) |
| *B60Q 1/56* | (2006.01) |
| *B60Q 1/30* | (2006.01) |
| *B60Q 3/20* | (2017.01) |
| *B60Q 1/50* | (2006.01) |
| *B60R 13/00* | (2006.01) |
| *B60Q 3/80* | (2017.01) |
| *B60Q 3/82* | (2017.01) |
| *B60Q 3/30* | (2017.01) |

(52) U.S. Cl.
CPC ............. *B60Q 3/20* (2017.02); *B60Q 1/2661* (2013.01); *B60Q 1/50* (2013.01); *B60Q 3/80* (2017.02); *B60R 13/005* (2013.01); *B60Q 3/30* (2017.02); *B60Q 3/82* (2017.02)

(58) Field of Classification Search
CPC ... B60Q 3/20; B60Q 3/80; B60Q 3/30; B60Q 1/2661; B60Q 1/50; B60R 13/005
See application file for complete search history.

(56) References Cited

U.S. PATENT DOCUMENTS

| | | | |
|---|---|---|---|
| 2009/0024276 A1* | 1/2009 | Mercurio | ................. B60Q 3/80 701/36 |
| 2017/0043712 A1* | 2/2017 | Paszkowicz | ........... B60K 37/00 |

* cited by examiner

*Primary Examiner* — David V Bruce
(74) *Attorney, Agent, or Firm* — Gulf Coast Intellectual Property Group

(57) ABSTRACT

An illuminated vehicle accessory system that is disposed within an automobile and is operable to provide decorative lighting effects. The illuminated vehicle accessory system includes a controller having a CPU and a user interface operable to control a plurality of lighted accessories. The lighted accessories include a floor mat, trunk mat and mud flaps. The lighted accessories include a body having a perimeter edge operable to mateable engage with an area of a vehicle in which the lighted accessories will be mounted. The lighted accessories include a light channel integrally formed therein wherein the light channel is proximate the perimeter edge of the body. A logo pad is further included having a logo and light ring wherein the logo pad is mounted to the body of the lighted accessories. The controller further includes a transceiver configured to facilitate control of the illuminated vehicle accessory system by an external device.

20 Claims, 3 Drawing Sheets

ILLUMINATED VEHICLE ACCESSORY SYSTEM

FIELD OF THE INVENTION

The present invention relates generally to vehicle accessories, more specifically but not by way of limitation a set of illuminated vehicle accessories that are operable to have an illuminated portion wherein the set of vehicle accessories includes objects such as but not limited to floor mats, mud flaps and license plate borders.

BACKGROUND

Millions of people accessorize their vehicles for a variety of reasons. Some individuals mount functional accessories to their vehicles in order to outfit the vehicle for a particular sport, such as but not limited to roll bars for various types of racing. It is also common to accessorize a vehicle for the purpose of providing visual aesthetics only. This is commonly done by adding custom wheels or other similar types of accessories to a vehicle. Additionally, other common types of accessorizing, includes custom paint features, racks and numerous types of other items.

It is common to add accessories such as but not limited to floor mats and mud flaps to a vehicle. The floor mats currently available range from fully carpeted floor mats to rubber floor mats that are operable to provide enhanced protection from elements such as mud and water. It is also common to accessorize a vehicle with custom lighting. Current technology utilizes LED lights or similar lighting an in one embodiment provides lighting underneath a vehicle so as to provide exterior decorative lighting. While vehicle accessory lights exist in current technology, there are no illuminated vehicle accessories such as but not limited to illuminated floor mats and illuminated mud flaps.

Accordingly, there is a need for a illuminated vehicle accessory system that provides illuminated vehicle accessories such as but not limited to illuminated floor mats wherein the illuminated vehicle accessories are operably coupled to the electrical system of the vehicle and wherein the illuminated vehicle accessories are configured to be controlled utilizing at least one remote controller.

SUMMARY OF THE INVENTION

It is the object to provide an illuminated vehicle accessory system that includes a plurality of illuminated accessories wherein the illuminated accessories include illuminated logos and illuminated edges.

Another object of the present invention is to provide an illuminated vehicle accessory system that includes a plurality of illuminated vehicle accessories wherein the accessories are electrically coupled to the electrical system of the vehicle.

A further object of the present invention is to provide an illuminated vehicle accessory system that includes a plurality of illuminated vehicle accessories wherein at least one of the illuminated accessories includes a pressure sensor that is operable to control the illumination of the vehicle accessory.

An additional object of the present invention is to provide an illuminated vehicle accessory system having a plurality of illuminated accessories that includes a controller that is operable to provide a user interface and control of the illuminated accessories and wherein the controller includes the necessary electronics to store, receive, manipulate and transmit data.

Still another object of the present invention is to provide an illuminated vehicle accessory system including but not limited to illuminated floor mats wherein the controller is further configured to be operably coupled to an application loaded on a smartphone or tablet PC.

Yet a further object of the present invention is to provide an illuminated vehicle accessory system that includes a plurality of illuminated accessories wherein the illumination is provided in a plurality of colors.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
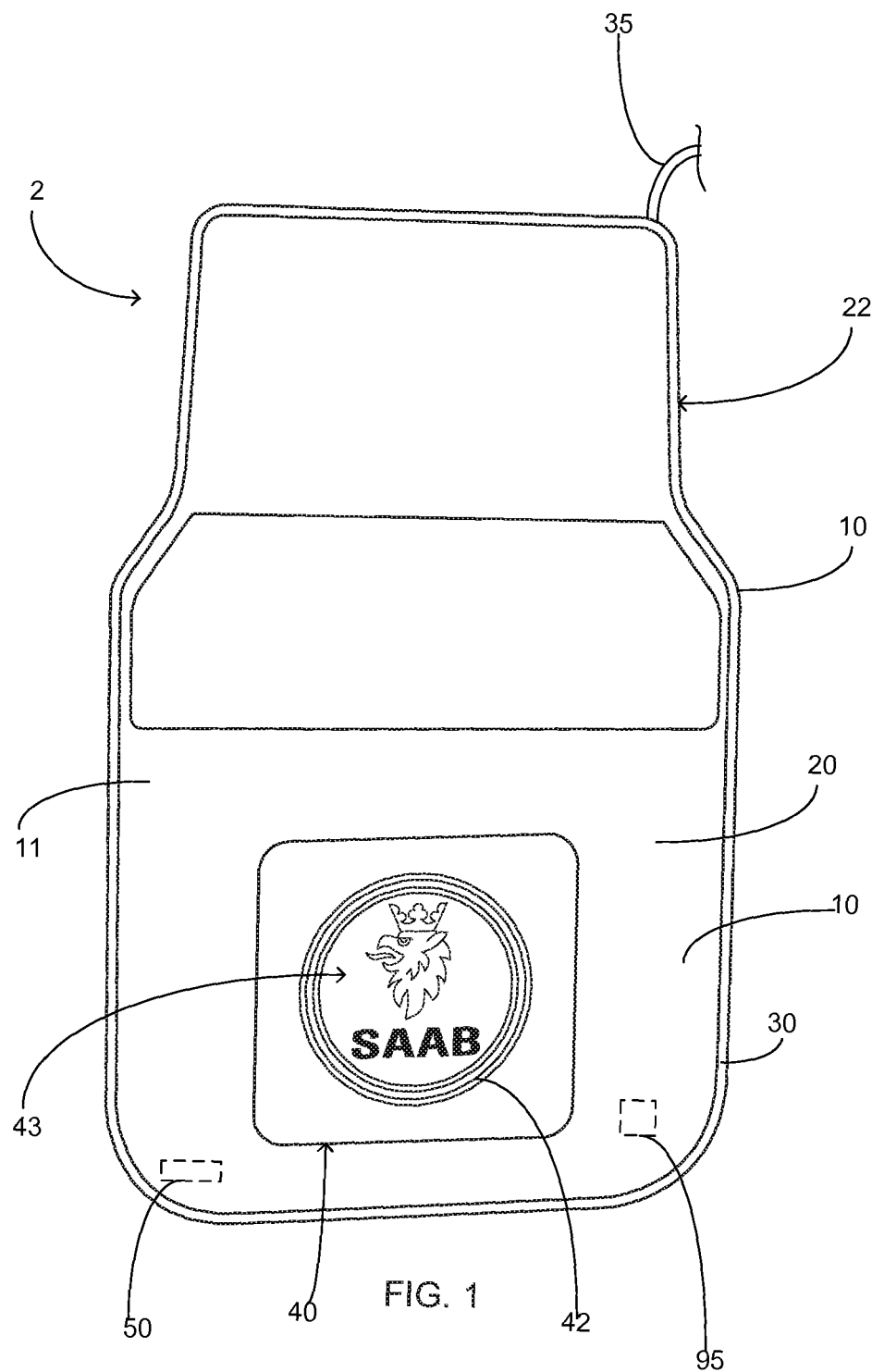
FIG. 1 is a perspective view of an embodiment of a vehicle floor mat of the present invention.

Referring now to the drawings submitted herewith, wherein various elements depicted therein are not necessarily drawn to scale and wherein through the views and figures like elements are referenced with identical reference numerals, there is illustrated an illuminated vehicle accessory system 100 constructed according to the principles of the present invention.

The illuminated vehicle accessory system 100 includes a plurality of accessories 2 that are operable to be mounted and/or secured within an exemplary vehicle. The illuminated vehicle accessory system 100 includes a mat 10 that is manufactured from as suitable durable material such as but not limited to rubber. The mat 10 includes a body 20 that is planar in manner and has a perimeter edge 22 that is shaped to fit specifically in a desired location on the floor of an exemplary vehicle such as but not limited to a truck or automobile. By way of example but not by way of limitation, the perimeter edge 22 illustrated in FIG. 1 is shaped so as to be placed on a floor of a vehicle to be used as a floor mat wherein the foot-well area of the vehicle has a mateable shape to the perimeter edge 22 so as to facilitate optimum placement within a vehicle. While a particular shape of perimeter edge 22 for the mat 10 is illustrated herein in FIG. 1, it is contemplated within the scope of the present invention that the mat 10 could be formed having a perimeter edge defining numerous different shapes in order to accomplish the desired objective herein. Further, it is contemplated within the scope of the present invention that the mat 10 could be manufactured in a variety of colors and from a variety of materials.

Adjacent to the perimeter edge 22 is a light channel 30. The light channel 30 completely encircles the mat 10 adjacent to the perimeter edge 22. The light channel 30 is flush with the upper surface 11 of the mat 10 and includes a light source disposed therein such as but not limited to a LED light chain. The light channel 30 is operable to provide a light source of low intensity providing a desired visual effect. The light channel 30 is contemplated to be configured to produce light having a variety of different colors and further being able to be illuminated in either a solid pattern or a random pattern such as but not limited to blinking. While the light channel 30 is illustrated herein as being disposed around the mat 10 proximate the perimeter edge 22 it is contemplated within the scope of the present invention that the light channel 30 could be partially disposed around the mat 10 such as just the top area or the bottom area. Additionally, it is contemplated within the scope of the present invention that the light channel 30 could be oriented in a pattern across the upper surface 11. The light channel 30 is electrically coupled to the controller 80 and the electrical system of the vehicle in which it is disposed via wire 35. Wire 35 is a conventional electric wire that functions to operably connect the mat 10 to the controller 80 and the electrical system of the vehicle. Alternatively, it is contemplated within the scope of the present invention that the mat 10 could have a power supply 50 disposed therein. In this embodiment the power supply 50 is operable to provide the necessary power required to illuminate the light channel 30.

The mat 10 further includes pressure sensor 95. Pressure sensor 95 is a conventional sensor and/or switch operable to detect pressure from a foot of a user or other source. The pressure sensor 95 is operably coupled to the controller 80 and functions to provide a technique for a user to either turn on or turn off a particular mat 10. The pressure sensor 95 is secured within the body 20 of the mat 10 such that it is not visible. It is contemplated that the upper surface 11 of the mat 10 could have an outline or other indicia indicating the location of the pressure sensor 95.

Disposed on the upper surface 11 of the mat 10 is a logo pad 40. The logo pad 40 is secured to the mat 10 utilizing suitable durable techniques. The logo pad 40 includes a light ring 42 and a logo 43. The light ring 42 is constructed as the light channel 30 so as to provide an illumination source for the logo pad 40. While a particular exemplary logo 43 and shape of logo pad 40 have been illustrated herein, it is contemplated within the scope of the present invention that the logo pad 40 could be formed in numerous different shapes and include a variety of logos 43. The logo pad 40 is electrically coupled to the controller 80, power supply 50 or electrical system of the vehicle in which the mat 10 is disposed via wire 35.

Figure 4:
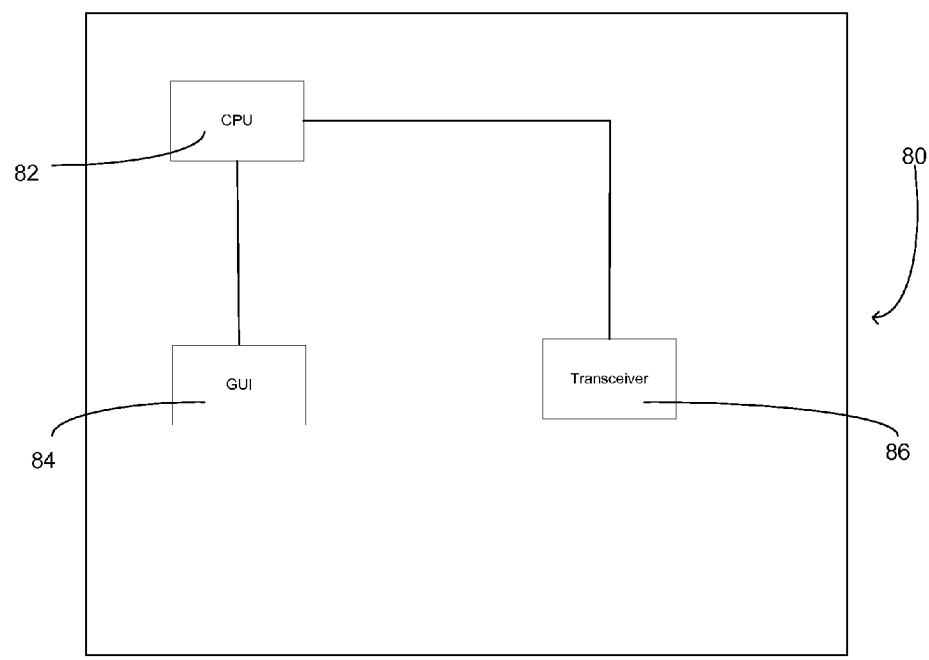
FIG. 4 is a diagrammatic view of the controller of the present invention.

Referring in particular to FIG. 4 herein, a diagrammatic scheme of the controller 80 of the present invention is illustrated therein. The controller 80 includes a central processing unit 82 that contains the necessary electronics operable to store, receive, transmit and manipulate data. The central processing unit 82 is operable to provide the functional control of the illuminated vehicle accessory system 100. This is to include but not limited to such functions as light pattern, light color and light intensity. The controller 80 further includes a graphical user interface 84. This is embodied as a conventional LCD screen having multi-capacitance capabilities so as to facilitate a touch screen interface with the controller 80. It is contemplated within the scope of the present invention that the controller 80 could be a remote unit or that it could be mounted within the vehicle in a location such as but not limited to a dashboard. The controller 80 further includes a transceiver 86 that is operable to provide communications with an additional device in order to facilitate the operation of the illuminated vehicle accessory system 100. More specifically but not by way of limitation, the transceiver 86 could be configured to utilize Bluetooth to communicate with a smartphone so as to allow control of the illuminated vehicle accessory system 100 via a smartphone. In this embodiment, a conventional smartphone is loaded with a software application that provides the necessary prompts and controls to facilitate operation of the illuminated vehicle accessory system 100.

Figure 2:
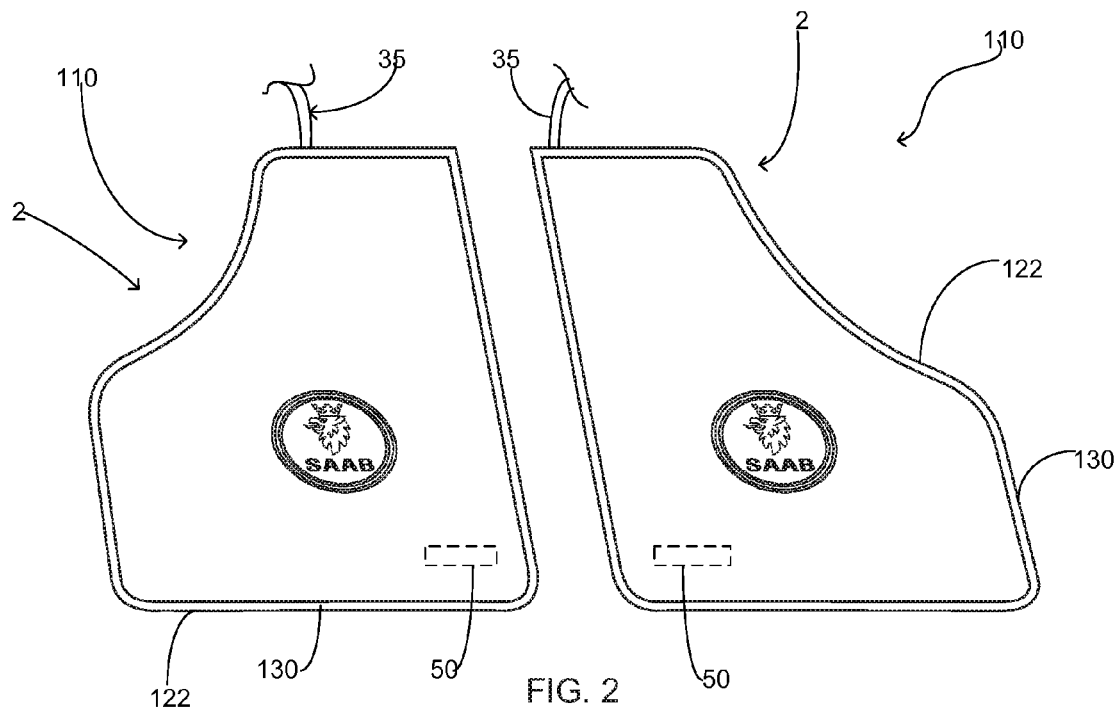
FIG. 2 is a perspective view of an embodiment of a pair of mud flaps of the present invention.

Referring in particular to FIG. 2 herein, a pair of mud flaps 110 of the illuminated vehicle accessory system 100 are illustrated herein. The mud flaps 110 are constructed similarly to the mat 10 as previously described herein. The mud flaps 110 include perimeter edge 122, light channel 130 and power supply 50. Further the mud flaps 110 include wire 35. The aforementioned elements of the mud flaps 110 function identically to the elements of the mat 10 described herein. The mud flaps 110 are configured to be secured to the exterior of a vehicle and further include a lighted logo area 140 that is constructed similarly to the logo pad 40.

Figure 3:
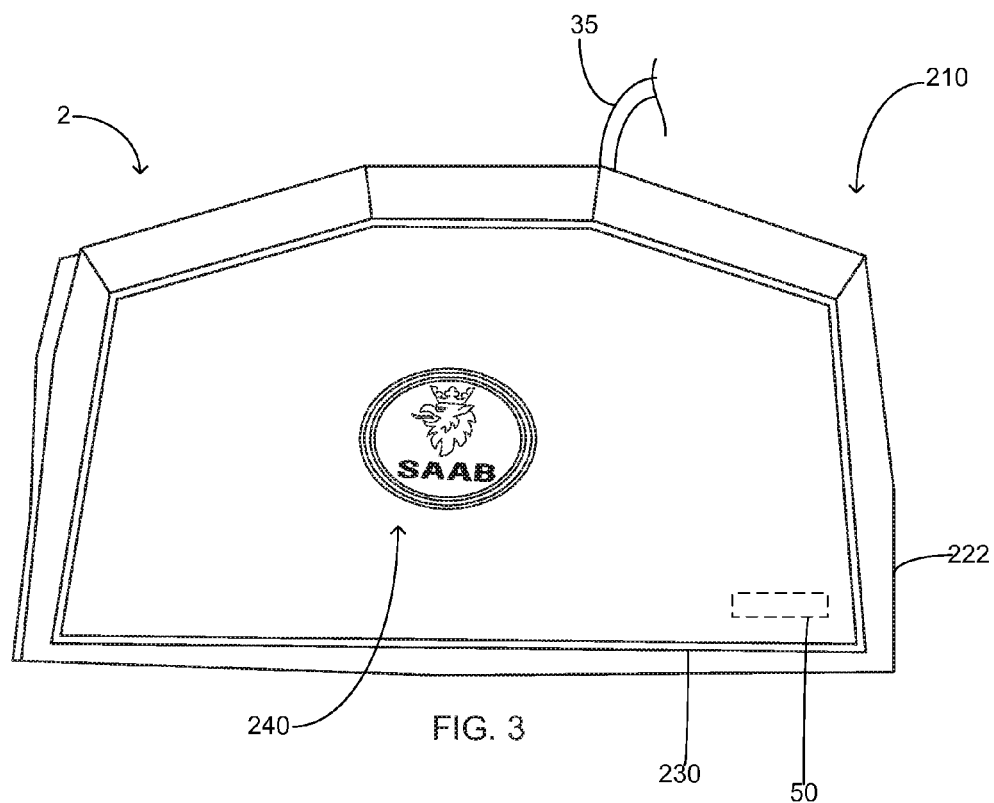
FIG. 3 is a perspective view of an embodiment of a trunk mat of the present invention.

Referring in particular to FIG. 3 herein is an exemplary trunk mat 210 of the illuminated vehicle accessory system 100. The trunk mat 210 includes a perimeter edge 222, light channel 230 and logo pad 240 similar to the mat 10. The trunk mat further includes power supply 50 and is electrically coupled to the controller 80 and electrical system of the vehicle in which it is disposed via wire 35. The trunk mat 210 operates and is controlled in the same manner as the mat 10 previously described herein. While the embodiment in FIG. 3 herein illustrates an exemplary trunk mat 210, it is contemplated within the scope of the present invention that the trunk mat 210 could be adapted to be placed in the bed of a conventional pick-up truck in addition to a trunk of an automobile.

While not particularly illustrated herein, it is contemplated within the scope of the present invention that the illuminated vehicle accessory system 100 include a lighted license plate frame and an external logo pad that is operable to be secured to the exterior of a vehicle. The lighted license plate frame and external logo pad are constructed similarly to the mat 10, trunk mat 210 and mud flaps 110 as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle accessory system operable to provide decorative illumination to a vehicle comprising:
   a controller, said controller having a central processing unit, said central processing unit having the necessary electronics operable to store, receive, transmit and manipulate data, said controller further including a graphical user interface, said controller being mounted within a vehicle;
   an accessory, said accessory having a body, said body being planar in manner and manufactured from a suitable durable material, said accessory being operably coupled to said controller, said accessory having a defined perimeter edge, said perimeter edge of said accessory operable to dictate its location on a vehicle;
at least one light channel, said at least one light channel, being integrally formed within said body of said accessory, said at least one light channel being electrically coupled to said controller and an electrical system of a vehicle in which said accessory is disposed; and
wherein said accessory is operable to provide a decorative illumination effect for the vehicle in which the vehicle accessory system is disposed.

2. The vehicle accessory system as recited in claim 1, wherein said controller further includes a transceiver, said transceiver operable to communicate with an external device so as to facilitate control of the vehicle accessory system by the external device.

3. The vehicle accessory system as recited in claim 2, wherein the external device is selected from a group consisting of one of the following: smartphone or tablet PC.

4. The vehicle accessory system as recited in claim 1, wherein said body of said accessory further includes a logo pad, said logo pad being secured to said body utilizing suitable techniques, said logo pad further including a light ring, said light ring integrally formed into said logo pad, said logo pad being electrically coupled with said controller.

5. The vehicle accessory system as recited in claim 4, wherein said body of said accessory further includes a pressure sensor, said pressure sensor operably coupled to said light channel and said controller, said pressure sensor operable to provide a user interface to operate the vehicle accessory system.

6. The vehicle accessory system as recited in claim 1, wherein said accessory further includes a power supply.

7. The vehicle accessory system as recited in claim 1, wherein said accessory is selected from one of the following group consisting of: a floor mat, a trunk mat, a mud flap or a license plate frame.

8. An illuminated vehicle accessory system operable to provide decorative lighting to various portions of an automobile comprising:
a controller, said controller having a central processing unit, said central processing unit having the necessary electronics operable to store, receive, transmit and manipulate data, said controller further including a graphical user interface, said graphical user interface being configured as a touch screen LCD display, said controller being mounted within a vehicle, said controller being electrically coupled to a power system of an automobile in which the illuminated vehicle accessory system is mounted;
an accessory, said accessory having a body, said body being planar in manner and manufactured from a suitable durable material, said accessory being operably coupled to said controller, said accessory having a defined perimeter edge, said perimeter edge of said accessory having a mateable shape to that of an area of an automobile in which the accessory will be secured;
a light channel, said light channel, being integrally formed within said body of said accessory, said light channel being adjacent the said perimeter edge of said body of said accessory, said light channel being electrically coupled to said controller and an electrical system of a vehicle in which said accessory is disposed; and
a logo pad, said logo pad being secured to said body of said accessory, said logo pad further including a light ring, said logo pad being operably coupled to said controller, said light ring of said logo pad operable to provide decorative illumination.

9. The illuminated vehicle accessory system as recited in claim 8, wherein said accessory is selected from one of a group consisting of: a floor mat, a trunk mat or a mud flap.

10. The illuminated vehicle accessory system as recited in claim 9, wherein said controller further includes a transceiver, said transceiver operable to communicate with an external device so as to facilitate control of the illuminated vehicle accessory system by the external device.

11. The illuminated vehicle accessory system as recited in claim 10, wherein the external device is selected from a group consisting of one of the following: smartphone or tablet PC.

12. The illuminated vehicle accessory system as recited in claim 10, and further including a power supply, said power supply disposed within said body of said accessory, said power supply operably coupled to said light channel.

13. The illuminated vehicle accessory system as recited in claim 12, wherein said body of said accessory further includes a pressure sensor, said pressure sensor operably coupled to said light channel and said controller, said pressure sensor operable to provide a user interface to operate the illuminated vehicle accessory system.

14. The illuminated vehicle accessory system as recited in claim 13, wherein said light channel is operable to provide decorative light in a plurality of colors.

15. An illuminated vehicle accessory system operable to be mounted in various location of an automobile wherein the illuminated vehicle accessory system provides decorative lighting accents comprising:
a controller, said controller having a central processing unit, said central processing unit having the necessary electronics operable to store, receive, transmit and manipulate data, said controller further including a graphical user interface, said graphical user interface being configured as a touch screen LCD display, said controller being mounted within a vehicle, said controller being electrically coupled to a power system of an automobile in which the illuminated vehicle accessory system is mounted, said controller further including a transceiver, said transceiver operable to connect with an external device, said transceiver operable to facilitate control of the illuminated vehicle accessory system by said external device;
an accessory, said accessory having a body, said body being planar in manner and manufactured from a suitable durable material, said accessory being operably coupled to said controller, said accessory having a defined perimeter edge, said perimeter edge of said accessory having a mateable shape to that of an area of an automobile in which the accessory will be secured;
a light channel, said light channel, being integrally formed within said body of said accessory, said light channel being adjacent the said perimeter edge of said body of said accessory and further being circumferentially disposed around said body of said accessory, said light channel being electrically coupled to said controller and an electrical system of a vehicle in which said accessory is disposed;
a logo pad, said logo pad being secured to said body of said accessory, said logo pad further including a logo, said logo being centrally located on said logo pad, said logo pad further including a light ring, said logo pad being operably coupled to said controller, said light ring of said logo pad operable to provide decorative illumination; and a pressure sensor, said pressure sensor operably coupled to said light channel and said controller, said pressure sensor operable to provide a user interface to operate the vehicle accessory system.

16. The illuminated vehicle accessory system as recited in claim 15, wherein said accessory is selected from one of a group consisting of: a floor mat, a trunk mat or a mud flap.

17. The illuminated vehicle accessory system as recited in claim 16, wherein the external device is selected from a group consisting of one of the following: smartphone or tablet PC.

18. The illuminated vehicle accessory system as recited in claim 17, wherein said body of said accessory is manufactured from rubber or carpet.

19. The illuminated vehicle accessory system as recited in claim 18, wherein said light channel and said light ring are LED lights.

20. The illuminated vehicle accessory system as recited in claim 19, wherein said light channel and said light ring are operable to provide light in a plurality of colors.

* * * * *